UNITED STATES PATENT OFFICE.

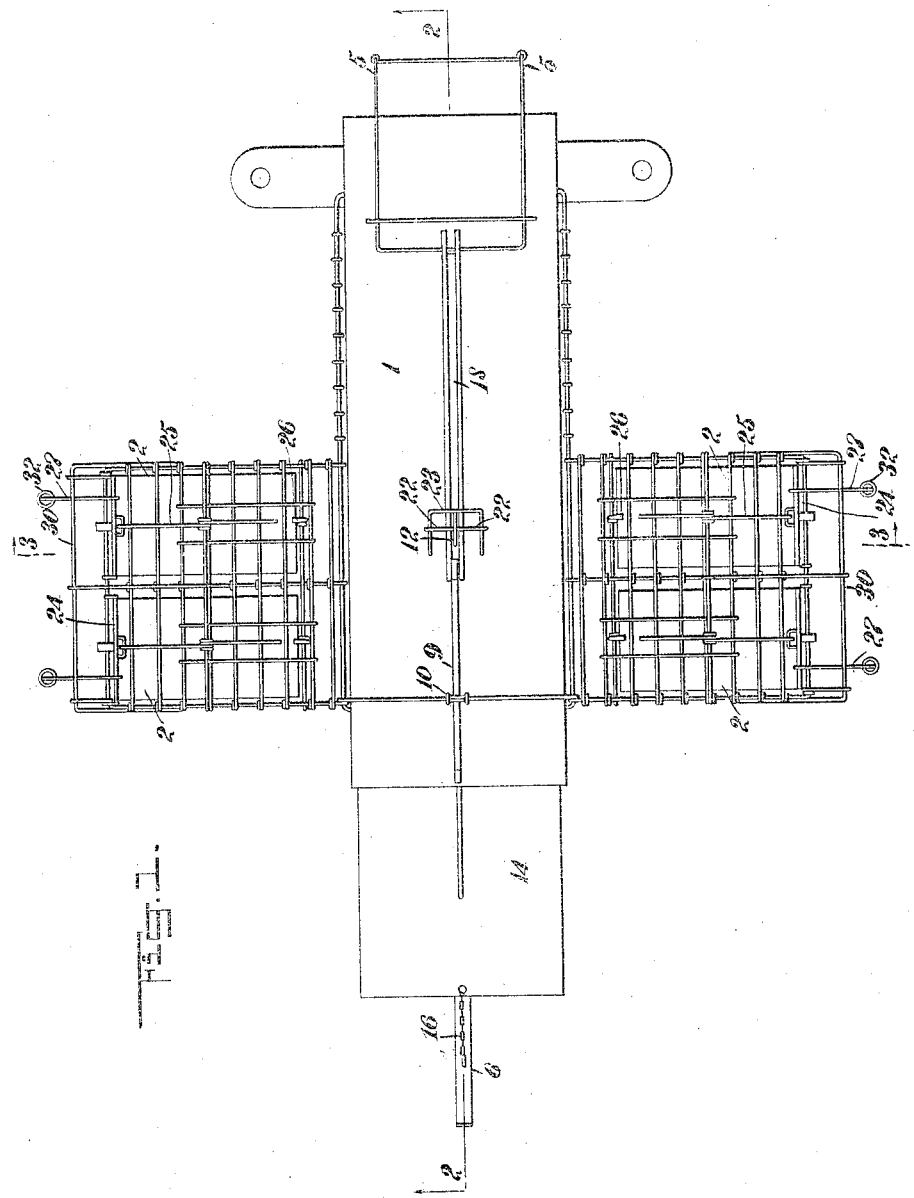

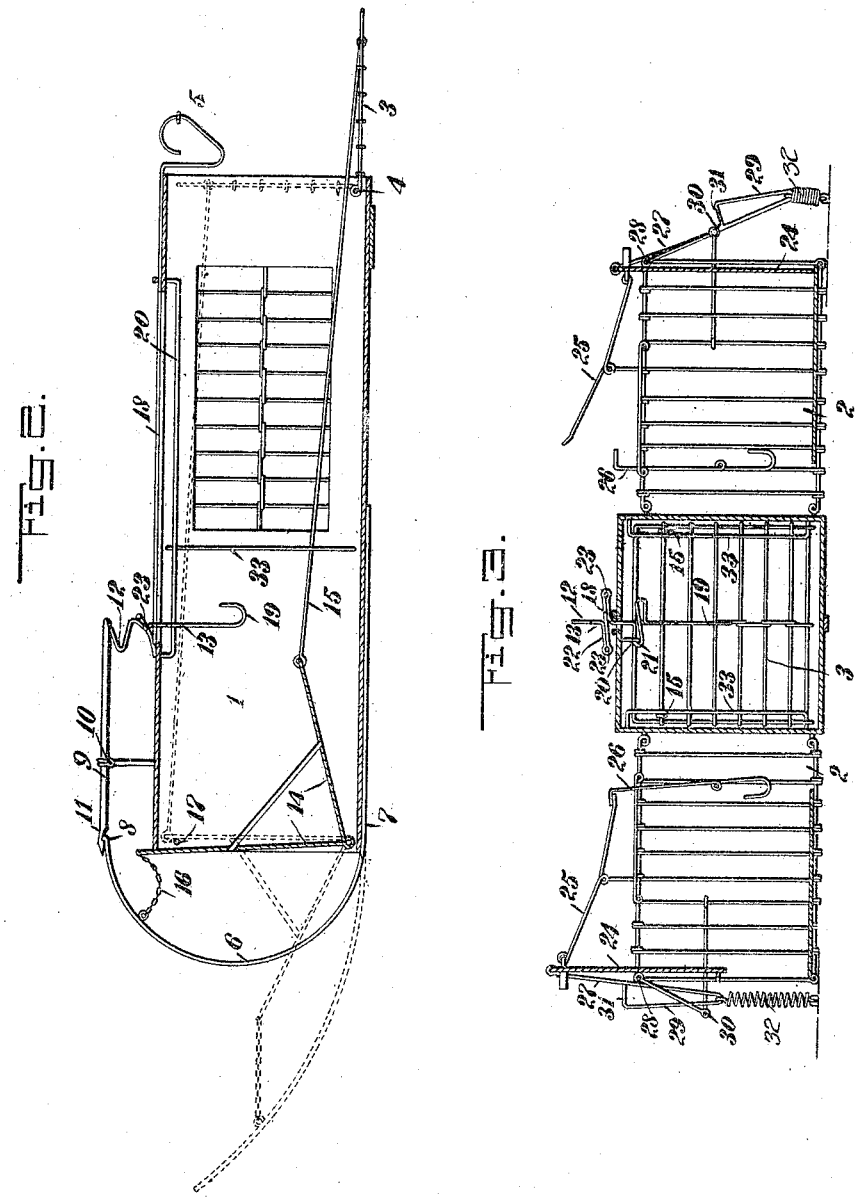

ISIDORO RAMIREZ, OF MATAMOROS, MEXICO.

CAGE-TRAP.

994,604.   Specification of Letters Patent.   Patented June 6, 1911.

Application filed September 1, 1909. Serial No. 515,571.

*To all whom it may concern:*

Be it known that I, ISIDORO RAMIREZ, a citizen of the Republic of Mexico, and a resident of Matamoros, in the State of Tamaulipas, Mexico, have invented a new and Improved Cage-Trap, of which the following is a full, clear, and exact description.

This invention relates to cage traps, and while the trap is designed more particularly for rats and mice, the features of construction may be utilized in traps intended more specially for catching other animals alive.

The chief object of the invention is to produce a cage trap that will be efficient in operation and entirely safe for human manipulation, even by children.

One of the leading features of novelty resides in a flat spring for closing the door of the cage; this spring being secured to the cage at one of its ends and adapted to be engaged at its free end by a device or member designed to hold it in bowed position under tension. The straightening of the spring pulls the door shut with great suddenness.

Another feature of novelty is the interposition, as a connecting element, between the main door and a spring for closing the same, of a double door in the nature of a bell-crank lever, which double door stands in another doorway of the cage, and the parts being so proportioned and arranged that one or other member of said double door closes its doorway whether the main or entrance door is open or closed. The advantage of this arrangement is that access may be had to the portion of the cage remote from the main door, without permitting animals to enter by the wrong doorway or to escape through the same, and at the same time economizing parts by constituting the double door part of the operating connection between the spring and the main or entrance door.

Another feature of novelty relates to a slidable bait-holding and setting device.

Further novelty is found in the form of spring latch for holding the sliding doors of the mice compartments closed.

Various other novel features and details of construction will be presently pointed out and specified in the claims.

Reference is to be had to the accompanying drawings forming a part of this specification, in which similar characters of reference indicate corresponding parts in all the views, and in which—

Figure 1 is a plan view of the improved trap; Fig. 2 is a vertical longitudinal sectional view of the same substantially on the line 2—2 in Fig. 1; and Fig. 3 is a vertical transverse sectional view, substantially on the line 3—3 in Fig. 1.

Referring now to the drawings, the numeral 1 indicates the rat cage or compartment, and the numeral 2 one or more mice cages or compartments, secured to the sides of the cage 1. The cage 1 may, as shown, be in the form of an elongated rectangular box, with open ends. The forward end of cage 1, which is the entrance end, is adapted to be closed by a pivoted door 3, preferably pivoted at its lower end, as at 4. A spring lock 5 secured to the end of the cage 1 is constructed to permit the door to ride past on closing and then to hold the door against opening. The door may be opened again by pulling the spring lock upward. The numeral 6 designates a flat spring, preferably located at the other end of the cage 1, being secured thereto at one end, as its lower end 7. This spring is adapted to be placed under tension by being bowed, as shown in Fig. 2, and to close the door 3 quickly upon straightening. The free, or upper, end 8 of this spring is adapted to be engaged and held, when the spring is bowed, by a member 9. This member may be a tilting device, as shown, pivoted intermediate its length, at 10. One end of the member 9 is conveniently notched beneath, as indicated at 11, to engage and hold the upper end of the spring 6, which may be provided with a lip as shown. The other end of member 9 is adapted to bear upon a narrow portion 12 of a bait-holding and setting device 13. When this end of the member 9 is deprived of the support of the device 13, as the result of said device being either tilted sidewise or slid away from the member 9, the said member 9 tilts, permitting the spring 6 to fly outward, a movement which I have termed "straightening", though, as shown in the drawings, the spring need not become really straight, but merely less bowed.

The preferred connections between the spring 6 and the door 3 comprise a part 14, which I have variously termed in the claims a "bell-crank lever" and a "double door in the nature of a bell-crank lever," rods 15 connecting the inner member of the double door 14 with the door 3, and a chain or other similar flexible connector 16 between the outer member of said double door and the spring 6. The chain 16 constitutes the connection between the spring 6 and the door 3 a lost-motion or slack connection, as indicated in Fig. 2, since the chain is slack when the spring 6 is set, whereby the spring, on straightening, closes the door 3 with a sudden jerk.

It will be seen that one or other member of the double door 14 closes the rear end of the cage 1, whether the door 3 is open or closed. A stop 17 is adapted to receive the impact of the inner member of the door 14, to hold the same closing the doorway. Preferably, there are two rods 15, one at each side of the cage 1 within, and desirably restrained in place by vertical keeper rods 33.

The bait-holding and setting device 13 is mounted to slide in a slot 18 in the top of the cage 1, which slot extends from a point near the door 3 to the rear portion of the cage. Thus, the bait-holding device may be slid close to the door 3 for convenience in affixing the bait. The device 13 is preferably formed of wire, its lower part being constructed to hold the bait, as by presenting a hook formation 19. A longitudinal guide rod 20 is preferably located beneath the top of the cage, adjacent and parallel with the slot 18; and the device 13 is preferably looped, as at 21, to slide on this rod. It is desirable to bend the upper part of the device 13 to present two lateral, oppositely extending, convolutions 22, which hold the side members of a substantially U-shaped piece of wire 23, the free ends of which rest on the top of the box, to give the device 13 greater stability against accidental displacement from sustaining relation with respect to the tiltable member 9.

The mice cages 2 have their open fronts provided with vertically slidable doors 24, which may be detained in elevated or set position by intermediately pivoted levers 25 and bait-holding and setting devices 26 of customary design. Depending from each door 24 is a spring latch member 27, adapted to slide and be flexed against a portion of the cage 2, as rod 28 thereof, to give it the requisite tension. This latch member 27 possesses an inclined riding surface 29 adapted to ride on a keeper rod 30, and a locking surface 31 adapted to spring behind said keeper, thus locking the door in lowered or closed position. Springs 32 may be secured to the latch members 27 and to stationary parts below, as tacks in the floor, to exert a downward pull on the doors for closing the same.

Having thus described my invention, I claim as new, and desire to secure by Letters Patent:—

1. A trap, comprising a cage, a door therefor, a flat spring adapted to be put under tension by being bowed, a member adapted to hold said spring in bowed position and to be released by an animal within the cage, and a pivoted device having members arranged at an angle to each other and connected respectively with the said spring and door whereby the spring on straightening closes the door.

2. A trap, comprising a cage, a pivoted door therefor, a flat spring secured at one of its ends to the cage and adapted to be put under tension by being bowed, a device adapted to engage with the free end of said spring to hold the same in bowed position, and means whereby said device is to be released by an animal within the trap, a pivoted device having members arranged at an angle to each other, a connection between one of said members and the door, and lost-motion connection between the other member and said spring whereby the spring on straightening pulls the door shut with a jerk.

3. A trap, comprising a cage, a pivoted door therefor, a flat spring secured at one of its ends to the cage and adapted to be put under tension by being bowed, a device adapted to engage with the free end of said spring to hold the same in bowed position, and means whereby said device is to be released by an animal within the trap, and connection between said spring and door including a pivoted member and a flexible part between said pivoted member and the spring which is slack when the spring is held by said device, whereby the spring on straightening pulls the door shut with a jerk.

4. A trap, comprising a cage, a door therefor, a flat spring secured at one of its ends to the cage and adapted to be put under tension by being bowed, a device adapted to engage with the free end of said spring to hold the same in bowed position, and means whereby said device is to be released by an animal within the trap, and connection between said spring and door whereby the spring on straightening closes the door, said connection including a bell-crank lever having one of its arms connected to said spring and the other arm to said door.

5. A trap, comprising a cage, a door therefor, a flat spring secured at one of its ends to the bottom of the cage at one end of the latter and adapted to be put under tension by being bowed around said end of the cage, a device adapted to engage with the free end of said spring to hold the same in bowed position, and means whereby said device is to be released by an animal within the cage, and connection between said spring and door whereby the spring on straightening closes the door with a jerk, said connection including a bell-crank lever having one of its arms connected with said door, and a flexible connector between the other arm of said bell-crank lever and said spring, said connector being adapted to be slack when said spring is held bowed by said device.

6. A trap, comprising a cage having two doorways, a door for closing one doorway, a double pivoted door in the nature of a bell-crank lever located in the other doorway, connection between said doors whereby when the outer member of said double door closes its doorway the first-mentioned door is open and when the inner member of said double door closes its doorway the first-mentioned door is closed, a spring for swinging said double door, and animal-releasable means for holding said spring under tension.

7. A trap, comprising a cage having opposed doorways, a pivoted door for closing one of said doorways, a double pivoted door in the nature of a bell-crank lever located in the other doorway, a connecting link between the first-mentioned door and the inner member of said double door, of such length that when the outer member of said double door closes its doorway the first-mentioned door is open and when the inner member of said double door closes its doorway the first-mentioned door is closed, a flat spring secured at one of its ends to the cage and adapted to be put under tension by being bowed, a device adapted to engage with the free end of said spring to hold the same in bowed position and means whereby said device is to be released by an animal within the trap, and connection between said spring and the outer member of said double door.

8. A trap, comprising a cage, a door therefor, a flat spring secured at one of its ends to the cage and adapted to be put under tension by being bowed, a pivoted member one end of which is connected with said spring and the other end with said door whereby the spring on straightening closes the door, a tiltable member adapted to hold the free end of said spring when the latter is bowed, and a bait-holding device adapted to release said tiltable member.

9. A trap, comprising a cage, a door therefor, a flat spring secured at its lower end to the cage and adapted to be put under tension by being bowed upward, a pivoted member one end of which is connected with said spring and the other end with said door, whereby the spring on straightening closes the door, a member pivoted intermediate its length having its under portion at one side of its pivot formed to retain the free end of said spring when bowed, and a bait-holding device upon which said member is adapted to bear at the other side of its pivot.

10. A trap, comprising a cage, having an elongated slot in its top, a door, a spring for closing said door, a guide, and a bait-holding and setting device mounted in said slot and having a looped member slidably engaging said guide.

11. A trap, comprising a cage having a slot in the top thereof extending from a point near the front of said cage to the rear part thereof, a door for closing the front of the cage, a spring for closing said door, and a bait-holding and setting device mounted slidably in said slot and having a member resting on the top of the cage.

12. A trap, comprising a cage, having an elongated slot in its top, and a guide rod beneath the top extending parallel and adjacent said slot, a door, a spring for closing the same, and a bait-holding and setting device mounted slidably on said guide and in said slot.

13. A trap, comprising a cage, having an elongated slot in its top, a door, a spring for closing the door, a pivoted member for holding the spring under tension, a bait-holding and setting device mounted slidably in said slot and formed of a piece of wire formed at its lower portion to receive the bait and above said slot bent to present a narrow portion upon which the said pivoted member is adapted to bear and two lateral convolutions, and a substantially U-shaped member held by said lateral convolutions with its ends adapted to bear against the top of said cage.

14. A trap, comprising a cage, a pivoted door therefor, a flat spring secured at one of its ends to the cage and adapted to be put under tension by being bowed, a device adapted to engage with the free end of said spring to hold the same in bowed position and means whereby said device is to be released by an animal within the trap, a pivoted member connected at one end with said spring and at the other end with said door whereby the spring on straightening pulls the door shut, and a spring lock mounted on the cage adapted to permit said door to latch past on closing and to hold the same closed.

In testimony whereof I have signed my name to this specification in the presence of two subscribing witnesses.

ISIDORO RAMIREZ.

Witnesses:
 DUKE JONES,
 CRISANTO VILLAREAL.